US006995765B2

(12) United States Patent
Boudier

(10) Patent No.: US 6,995,765 B2
(45) Date of Patent: Feb. 7, 2006

(54) SYSTEM, METHOD, AND COMPUTER PROGRAM PRODUCT FOR OPTIMIZATION OF A SCENE GRAPH

(75) Inventor: Pierre S. Boudier, Mountain View, CA (US)

(73) Assignee: Vicarious Visions, Inc., Troy, NY (US)

( * ) Notice: Subject to any disclaimer, the term of this patent is extended or adjusted under 35 U.S.C. 154(b) by 58 days.

(21) Appl. No.: 09/903,504

(22) Filed: Jul. 13, 2001

(65) Prior Publication Data

US 2003/0011637 A1 Jan. 16, 2003

(51) Int. Cl.
*G06T 17/00* (2006.01)
(52) U.S. Cl. .................. 345/428; 715/771; 345/501
(58) Field of Classification Search ............. 345/771, 345/419, 420, 421, 423, 424, 426, 427, 428, 345/440, 441, 473, 474, 475, 581, 582, 583, 345/584, 585, 586, 587, 501, 502, 503, 504, 345/505, 506, 519, 520; 715/764, 771, 853
See application file for complete search history.

(56) References Cited

U.S. PATENT DOCUMENTS

| 5,896,139 A | | 4/1999 | Strauss ................... 345/440 |
| 6,154,215 A | * | 11/2000 | Hopcroft et al. ............ 345/418 |
| 2002/0063704 A1 | * | 5/2002 | Sowizral et al. ............ 345/419 |

OTHER PUBLICATIONS

Strauss, Paul S. et al., "An Object-Oriented 3D Graphics Toolkit," Computer Graphics, Copyright 1992, vol. 26, No. 2, Jul. 1992, pp. 341-349.

* cited by examiner

*Primary Examiner*—Ulka J. Chauhan
*Assistant Examiner*—Enrique L. Santiago
(74) *Attorney, Agent, or Firm*—Sterne, Kessler, Goldstein & Fox PLLC

(57) ABSTRACT

The invention described herein is a system, method, and computer program product for optimization of a scene graph. The system includes an optimization base that contains a set of specific atomic optimizations. The system also includes an optimization registry that lists each atomic optimization, parameters associated with each optimization, and priority information relating to the necessary order in which optimizations must be performed. The system also includes an optimization manager which creates, configures, and applies an optimization process to an input scene graph. The system further includes an optimization configuration module for accepting user input to the optimization process. The method includes the steps of receiving an input scene graph, creating the optimization process, applying the optimization process to the input scene graph, and post-optimization processing. The optimization process can be performed for any of a number of purposes, such as the enhancement of scene graph traversal time, the enhancement of drawing time, the reduction of memory usage, improved efficiency of data manipulation, and the targeting of a specific rendering platform.

60 Claims, 14 Drawing Sheets

SYSTEM, METHOD, AND COMPUTER PROGRAM PRODUCT FOR OPTIMIZATION OF A SCENE GRAPH

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/COMPUTER PROGRAM LISTING APPENDIX

Not applicable.

BACKGROUND OF THE INVENTION

1. Field of the Invention

The invention described herein relates to computer graphics, and more particularly to data representation and rendering.

2. Background Art

In computer graphics, a scene can be modeled in a variety of ways. One way is through the use of a scene graph. The nodes of a scene graph represent features of the scene, such as physical objects and their attributes (e.g., colors and textures). The edges of a scene graph represent associations between the connected nodes. A node representing an object, for example, may be connected to a node representing a texture for that object. Scene graphs are often represented in object oriented languages such as C++. Scene graphs are well known in the computer graphics field, and are described in greater detail in "The Inventor Mentor" by Josie Wernecke, published by Addison Wesley, incorporated herein by reference in its entirety. An example of a scene graph is shown in FIG. 1. Scene graph 100 represents a house. The house is identified with root node 110. The house includes a number of components, such as door 120, roof 130, and aggregate walls 140. Individual walls 150 through 180 are associated with aggregate walls 140. Each wall can have some number of attributes. For example, wall 180 is shown having texture 190.

Scene graphs can be produced by a modeler. A modeler can be a person or a program that converts a scene into one or more scene graphs. A number of modelers are available commercially, such as MAX and MAYA. Ultimately, a scene graph is rendered to produce an image. This is illustrated generally in FIG. 2. Here, a modeler 210a produces a scene graph that is processed through an export library 220a. Export library 220a manipulates the scene graph to put it in a form that can be rendered by rendering platform 240. Export library 220a may include an optimizer 230a that further revises the scene graph in order to optimize the graph in some manner prior to rendering. Optimizer 230a may, for example, manipulate the scene graph so as to minimize the memory requirements during rendering, or improve the drawing time.

As shown in FIG. 2, however, a rendering platform may have to accommodate scene graphs produced by a variety of modelers. Such modelers are illustrated in FIG. 2 as modelers 210a, 210b and 210c. Each modeler sends its scene graphs to rendering platform 240, via export libraries 220a, 220b, and 220c, respectively. As discussed above, each export library may include an optimizer. The optimizers for the respective export libraries are shown as optimizers 230a, 230b, and 230c, respectively.

The arrangement of FIG. 2 is inherently redundant and inefficient. The export libraries and their optimizers perform analogous functions. The code representing software embodiments of the export libraries and optimizers is therefore repetitive. Hence, there is a need for a common export library and, in particular, a common optimizer that can process the scene graphs produced by a variety of modelers such that the resulting scene graphs are tailored to a particular rendering platform.

BRIEF SUMMARY OF THE INVENTION

The invention described herein is a system, method, and computer program product for optimization of a scene graph. The system of the invention includes an optimization base that contains a set of specific atomic optimizations. The system also includes an optimization registry that lists each atomic optimization, parameters associated with each optimization, and priority information relating to the necessary order in which optimizations must be performed. The system also includes an optimization manager which creates, configures, and applies an optimization process to an input scene graph. The system further includes an optimization configuration module for accepting user input to the optimization process.

The method of the invention includes the steps of receiving an input scene graph, creating the optimization process, applying the optimization process to the input scene graph, and post-optimization processing. The optimization process can be performed for any of a number of purposes, such as the enhancement of scene graph traversal time, the enhancement of drawing time, the reduction of memory usage, improved efficiency of data manipulation, and the targeting of a specific rendering platform.

The foregoing and other features and advantages of the invention will be apparent from the following, more particular description of a preferred embodiment of the invention, as illustrated in the accompanying drawings.

BRIEF DESCRIPTION OF THE DRAWINGS/FIGURES

DETAILED DESCRIPTION OF THE INVENTION

Figure 1:
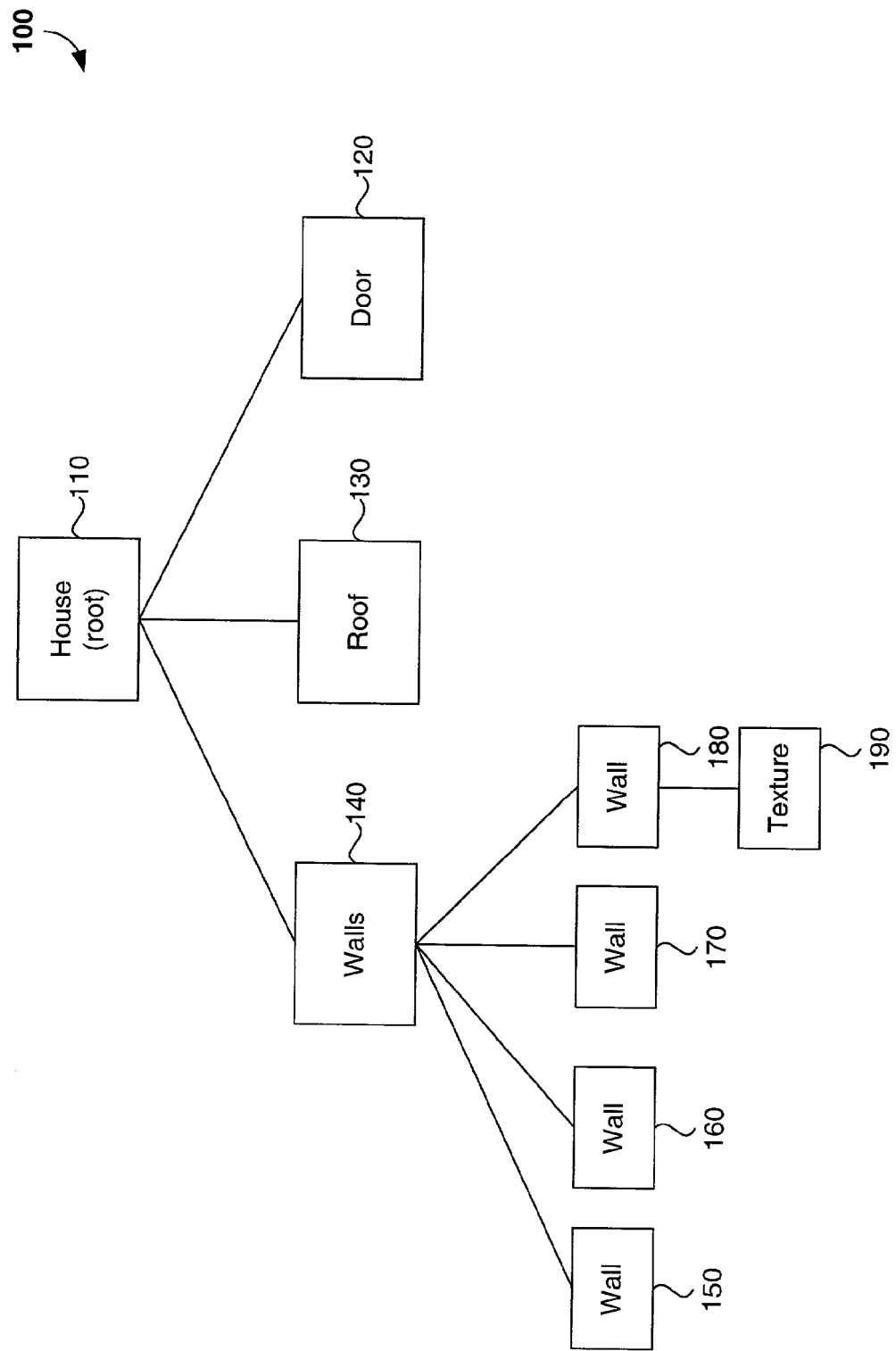
FIG. 1 illustrates an example of a scene graph.
Figure 2:
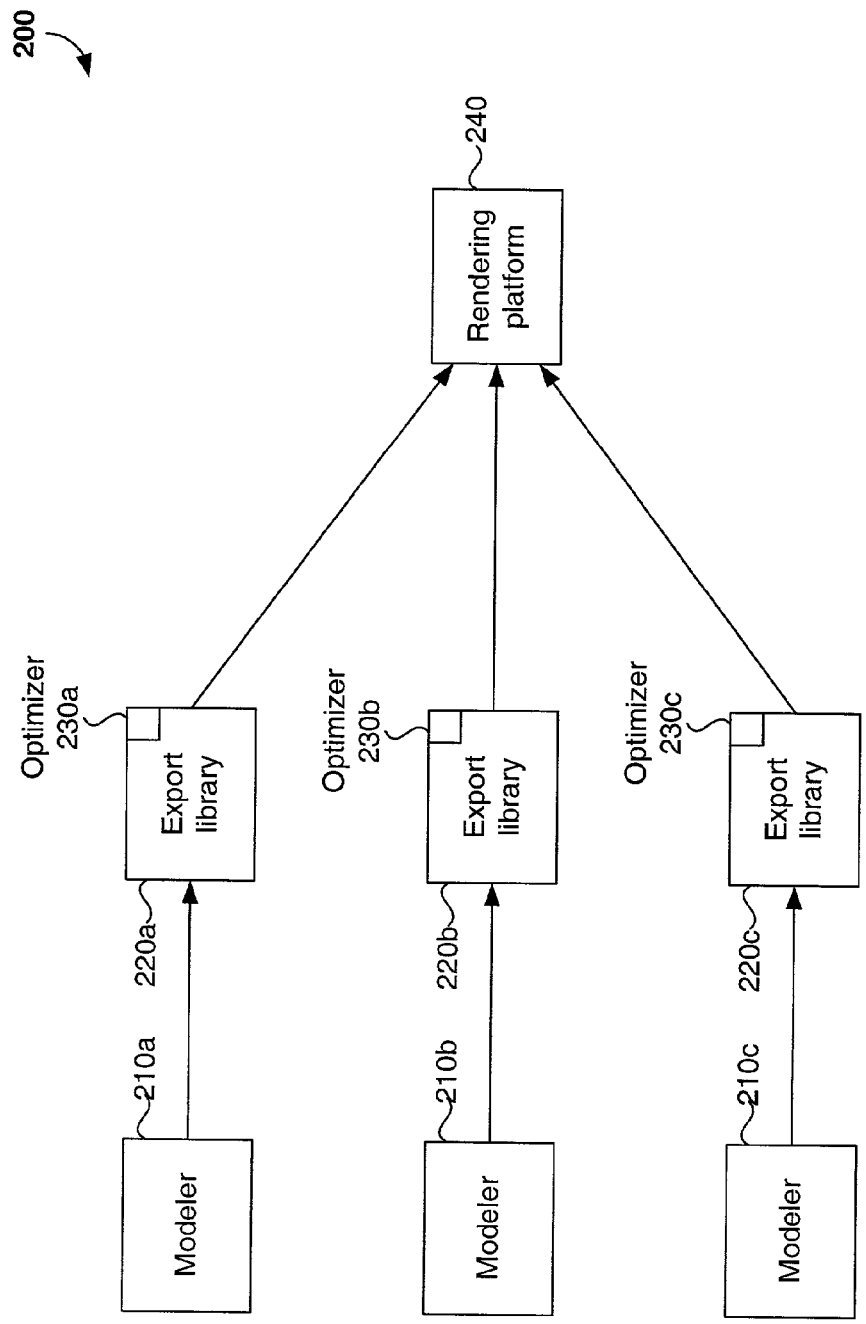
FIG. 2 illustrates the functional relationship between multiple modelers, their export libraries, and a rendering platform.

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Table of Contents

I. Overview
II. System
III. Process
IV. Atomic Optimizations
   A. Collapse Geometry
   B. Collapse Hierarchy
   C. Convert Image
   D. Convert Transform
   E. Create Bounding Boxes
   F. Flatten Hierarchy
   G. Generate Macro Texture
   H. Normalize Texture Coordinates
   I. Promote Attributes
   J. Remove Attributes
   K. Resize Image
   L. Share Attributes
   M. Spatial Partition
   N. Strip Triangles
   O. Transform Alpha
   P. Vertex Blending
V. Conclusion I. Overview The invention described herein represents a system, method, and computer program product for optimization of a scene graph, where the optimization is performed for any of a variety of purposes. The optimization can be performed so as to improve the drawing time of the renderer, improve the time required to traverse the scene graph, adjust the memory requirements of the renderer, improve the efficiency of the data manipulation during rendering, and/or to target the resulting scene graph to a particular rendering platform. The optimizer can be used with a variety of modelers and can produce a scene graph tailored to a specific rendering platform.

The invention described herein is a system, method, and computer program product for optimization of a scene graph. The system of the invention includes an optimization base that contains logic representing a set of specific atomic optimizations. An atomic optimization is an algorithm for optimizing a scene graph. Such an algorithm can be implemented with software or hardware logic, or a combination of the two. The system also includes an optimization registry that lists the atomic optimizations. The optimization registry also includes parameters associated with each optimization and priority information relating to the necessary order in which optimizations must be performed. The system also includes an optimization manager that creates, configures, and applies an optimization process to an input scene graph. The system further includes an optimization configuration module for accepting user input to the optimization process.

The method of the invention includes the steps of receiving an input scene graph, creating the optimization process, applying the optimization process to the input scene graph, and post-optimization processing. The optimization process can be performed for a number of purposes, such as the enhancement of scene graph traversal time, the enhancement of drawing time, the reduction of memory usage, improved efficiency of data manipulation, and/or the targeting of a specific rendering platform.

II. System

Figure 3:
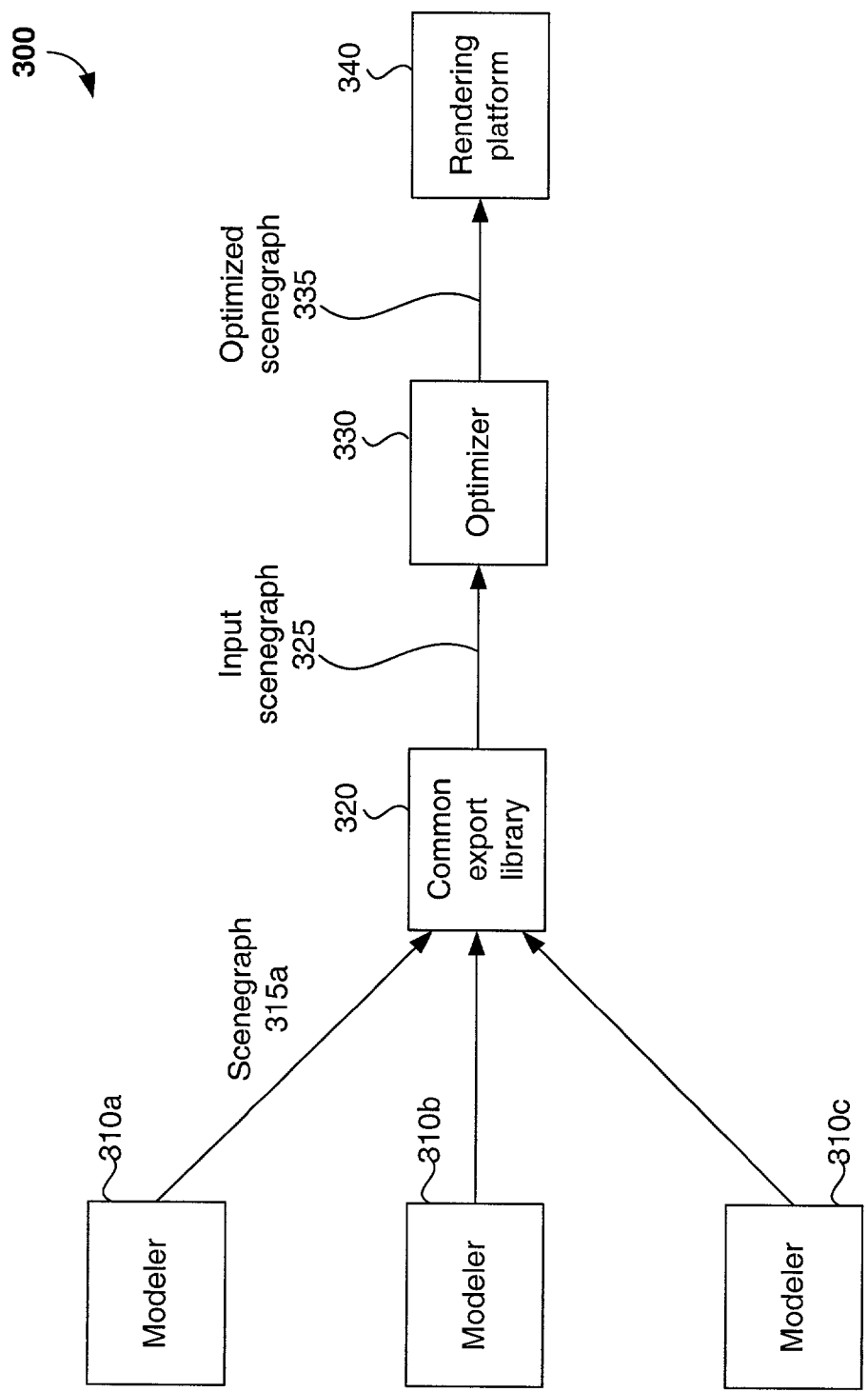
FIG. 3 illustrates the overall structural context of the invention described herein.

The system of the invention optimizes an input scene graph to produce an optimized scene graph which can then be rendered. The context in which the optimizer functions is illustrated in FIG. 3. A modeler 310*a* creates a scene graph 315*a* and passes it to a common export library 320. The scene graph exported from library 320 is then passed to optimizer 330. The exported scene graph is an input scene graph 325 for optimizer 330. Optimizer 330 then creates an optimized scene graph 335, which is sent to rendering platform 340. Library 320 and optimizer 330 can function with a variety of modelers, as shown. Like modeler 310*a*, modelers 310*b* and 310*c* can also create scene graphs that are sent to optimizer 330 via common export library 320.

Figure 4:
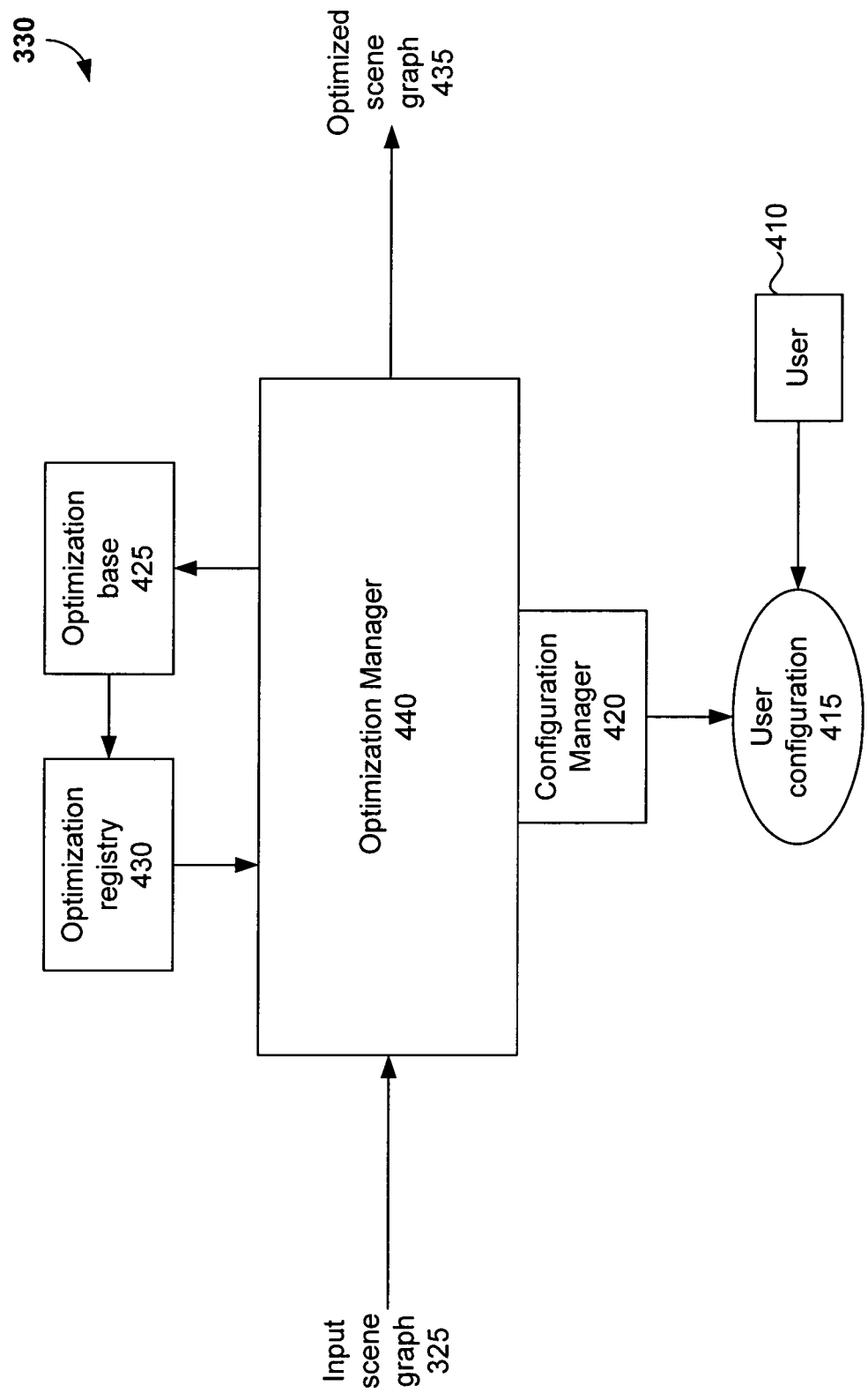
FIG. 4 illustrates the structure of a scene graph optimizer, according to an embodiment of the invention.

Optimizer 330 is shown in greater detail in FIG. 4, according to an embodiment of the invention. An input scene graph 325 is received by an optimization manager 440. Optimization manager 440 creates an optimization process based on a specific atomic optimization. The atomic optimization can be identified by a user, or a default optimization can be used. Optimization manager 440 also configures the atomic optimization. The configuration can be based on user input, or can be based on default configuration values. Optimization manager 440 then applies the optimization process to input scene graph 405, to produce an optimized graph 435.

In the illustrated embodiment, the selection of a specific atomic optimization is made by user 410. User 410 supplies user configuration information 415 to optimization manager 440 via a configuration manager 420. The set of available atomic optimizations is contained in an optimization base 425. A list of the available atomic optimizations is maintained in an optimization registry 430, along with information pertinent to the execution of the specific atomic optimizations. This information can include, for example, the parameters required by an atomic optimization, and any priority information that defines the sequence in which specific atomic optimizations can or should be applied. Given the choice of a specific atomic optimization identified in user configuration information 415, optimization manager 440 associates input scene graph 405 with the identified atomic optimization in optimization base 425, via optimization registry 430. User configuration information 415 can also include configuration information, e.g., parameters that must be defined for a given atomic optimization. In an embodiment of the invention, user configuration information 415 is supplied to configuration information manager 420 in the form of a text file. In an alternative embodiment of the invention, a user interface is supplied to user 410 allowing user 410 to identify, to configuration manager 420, selected atomic optimizations and parameters.

Note that optimization manager 440, configuration manager 420, optimization base 425, and optimization registry 430 can be implemented in hardware or software or any combination thereof. In an embodiment of the invention, these components are implemented using an object oriented language.

In an alterative embodiment of the invention (not shown), optimizer 330 and export library 320 can be integrated into a modeler, such as modeler 310a, such that modeling and optimization are combined in a single module. Alternatively, these components can be organized as illustrated in FIG. 3, but controlled through a user interface of the modeler, e.g., modeler 310a. In this arrangement, the user of the modeler controls both the modeling and optimization processes. Referring to FIG. 4, user configuration information 415 would be supplied to optimizer 330 through such a user interface.

Some of the specific atomic optimizations that can be used in the invention are discussed below in Section IV. The optimizations described therein are not meant to be limiting. Rather, the identified optimizations are meant to serve as examples of optimizations that can be used in the invention. Other optimizations not identified in Section IV can also be used within the scope of the invention described herein.

Figure 5:
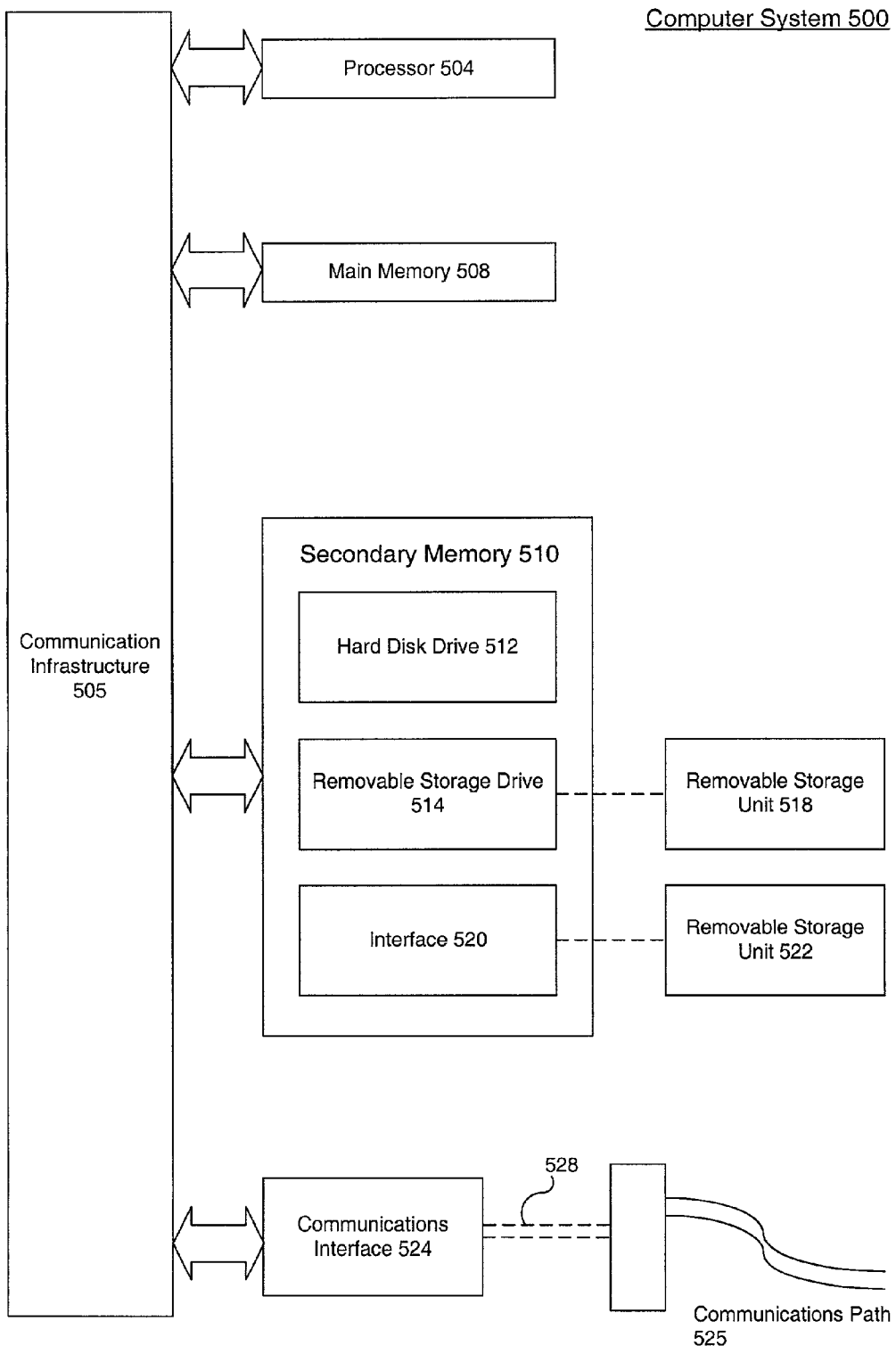
FIG. 5 illustrates the computing environment of the invention, according to an embodiment.

Referring again to FIG. 3, optimizer 330 may be implemented using hardware, software or a combination thereof. In particular, optimizer 330 may be implemented using an object-oriented approach, and execute on a computer system or other processing system. An example of such a computer system 500 is shown in FIG. 5. The computer system 500 includes one or more processors, such as processor 504. The processor 504 is connected to a communication infrastructure 506 (e.g., a bus or network). Various software embodiments can be described in terms of this exemplary computer system. After reading this description, it will become apparent to a person skilled in the relevant art how to implement the invention using other computer systems and/or computer architectures.

Computer system 500 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well known manner. Removable storage unit 518 represents a magnetic tape, optical disk, etc. As will be appreciated, the removable storage unit 518 includes a computer usable storage medium having stored therein computer software and/or data.

Secondary memory 510 can also include other similar means for allowing computer programs or input data to be loaded into computer system 500. Such means may include, for example, a removable storage unit 522 and an interface 520. Examples of such means also include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 into and out of computer system 500, and may be implemented using wire or cable, fiber optics, a phone line, a cellular phone link, an RF link and other communications channels. In an embodiment of the invention, signals 528 can convey information required by the optimizer 330, such as input scene graph 325 and user configuration information 415. Signals 528 can also convey optimized scene graph 435 to a graphics platform for rendering.

In this document, the terms "computer program medium" and "computer usable medium" are used to generally refer to media such as removable storage drive 514, a hard disk installed in hard disk drive 512, and signals 528. These computer program products are means for providing software to computer system 500. The invention is directed in part to such computer program products.

Computer programs (also called computer control logic) are stored in main memory 508 and/or secondary memory 510. Computer programs may also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

III. Process

Figure 6:
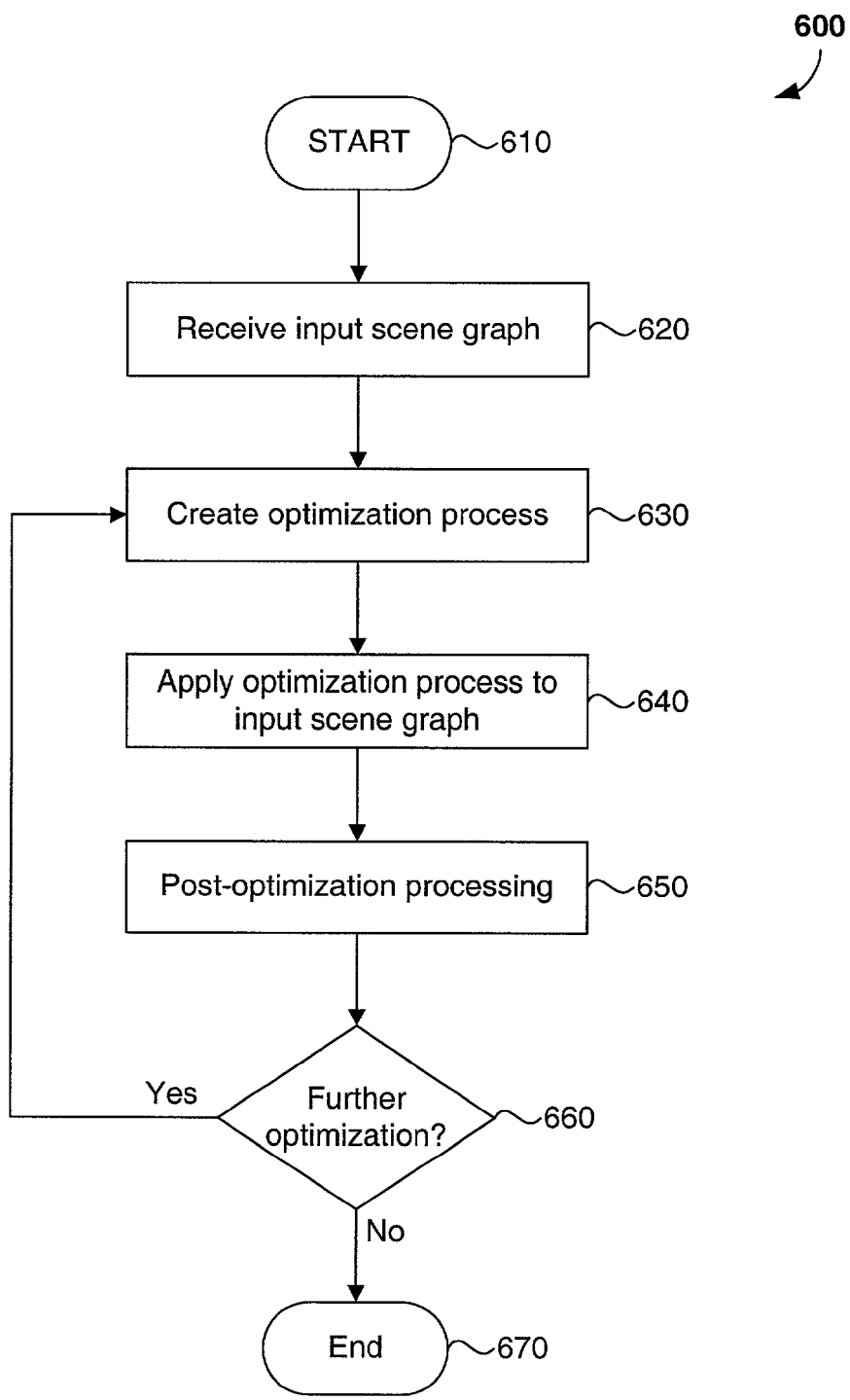
FIG. 6 illustrates the overall method of the invention.

The process of the invention includes receipt of an input scene graph, creation of an optimization process that may be based on user input, and application of the optimization process to create an optimized scene graph. This process is illustrated generally in FIG. 6. The process begins at step 610. In step 620, an input scene graph is received by the optimization manager. In step 630, an optimization process is created by the optimization manager, based on one or more specific atomic optimizations available, selection of one or more specific atomic optimizations by a user, and other user inputs. The optimization process embodies the selected atomic optimization, configured according to any user input and/or default configuration parameters. In step 640, the optimization manager applies the optimization process to the input scene graph. This results in the creation of an optimized scene graph. In step 650, post optimization processing is performed. As will be described below, post optimization processing includes the performance of validity checks on the optimized scene graph, and the collection and display of statistics relating to the performance of the optimization process.

In step 660, a determination is made as to whether further optimization is required. Such further optimization may be requested by the user, for example. If so, then the process continues at step 630, where a new optimization process is created. If, in step 660, no further optimization is required, then the process concludes at step 670. The process of FIG.

6 can therefore operate iteratively. The user can specify a specific atomic optimization, which is then performed; the user can then specify another atomic optimization (or repeat the first one), which is likewise performed. This can continue until the resulting scene graph has the properties desired by the user. Moreover, this allows the user to tailor the result to particular needs, e.g., to a particular rendering platform.

Figure 7:
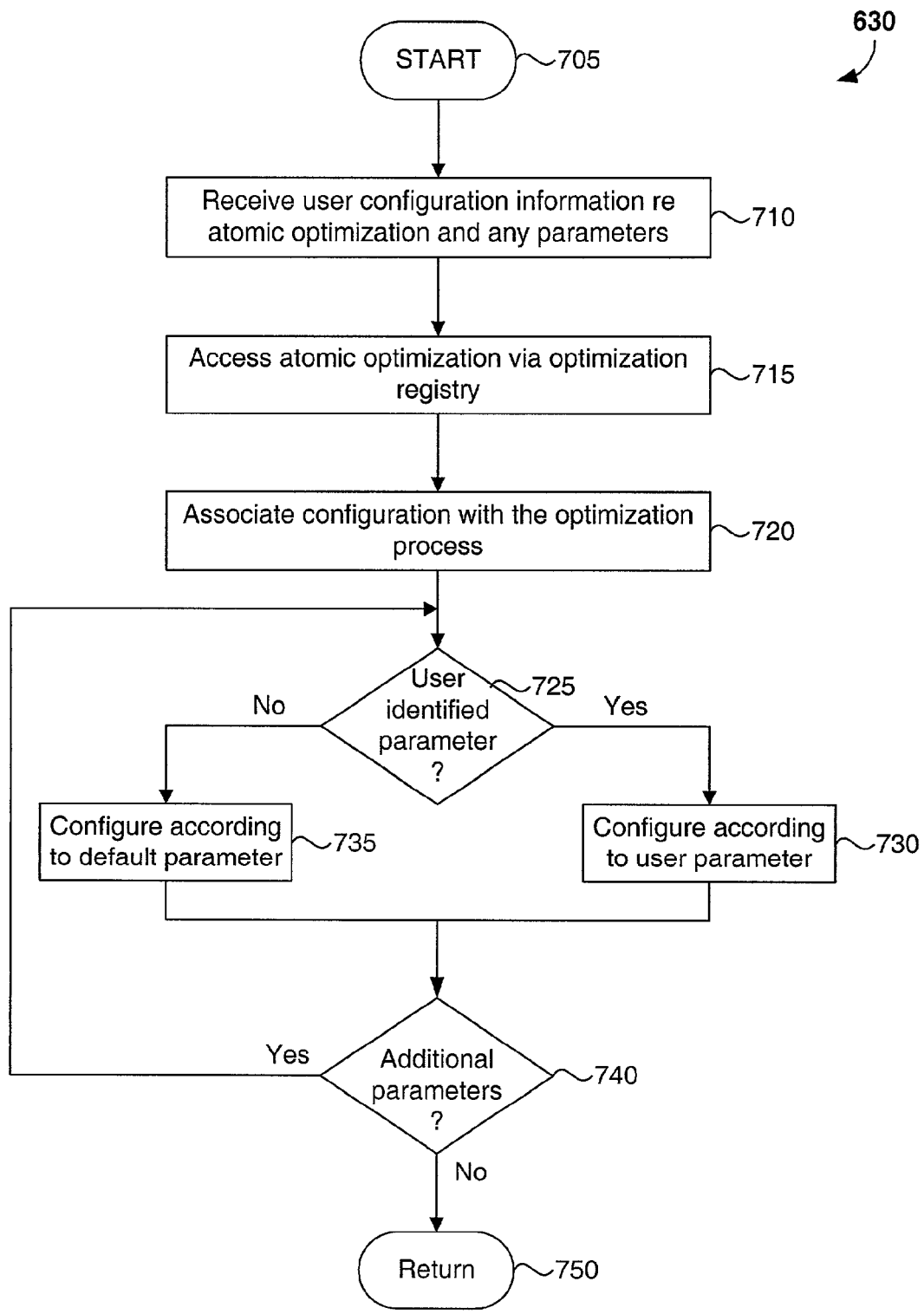
FIG. 7 illustrates the method of creating an optimization process, according to an embodiment of the invention.

Step 630 above, the creation of an optimization process, is illustrated in greater detail in FIG. 7. This process begins at step 705. In step 710, the optimization manager receives input from a user regarding a specific atomic optimization to be used, along with any parameters that the user elects to specify. As described above, the optimization manager receives the user configuration information via a configuration manager. In step 715, the optimization manager accesses a specific atomic optimization through an optimization registry. In step 720, the configuration information received in step 710 is associated with the optimization process.

In step 725, a determination is made as to whether the user has identified a parameter for the optimization. If so, then in step 730, the optimization is configured according to the user identified parameters. If, in step 725, there is no user identified parameter, then in step 735 the optimization is configured using a default parameter. In step 740, a determination is made as to whether there are any additional parameters required by the optimization. If so, then the process continues at step 725, where a determination is made as to whether the user has identified the parameter. If, in step 740, there are no additional parameters needed, then the process concludes at step 750.

In step 640 above, an optimization process, based on one or more specific atomic optimizations, is applied to an input scene graph. The processing associated with several specific atomic optimizations is described below in section IV.

Figure 8:
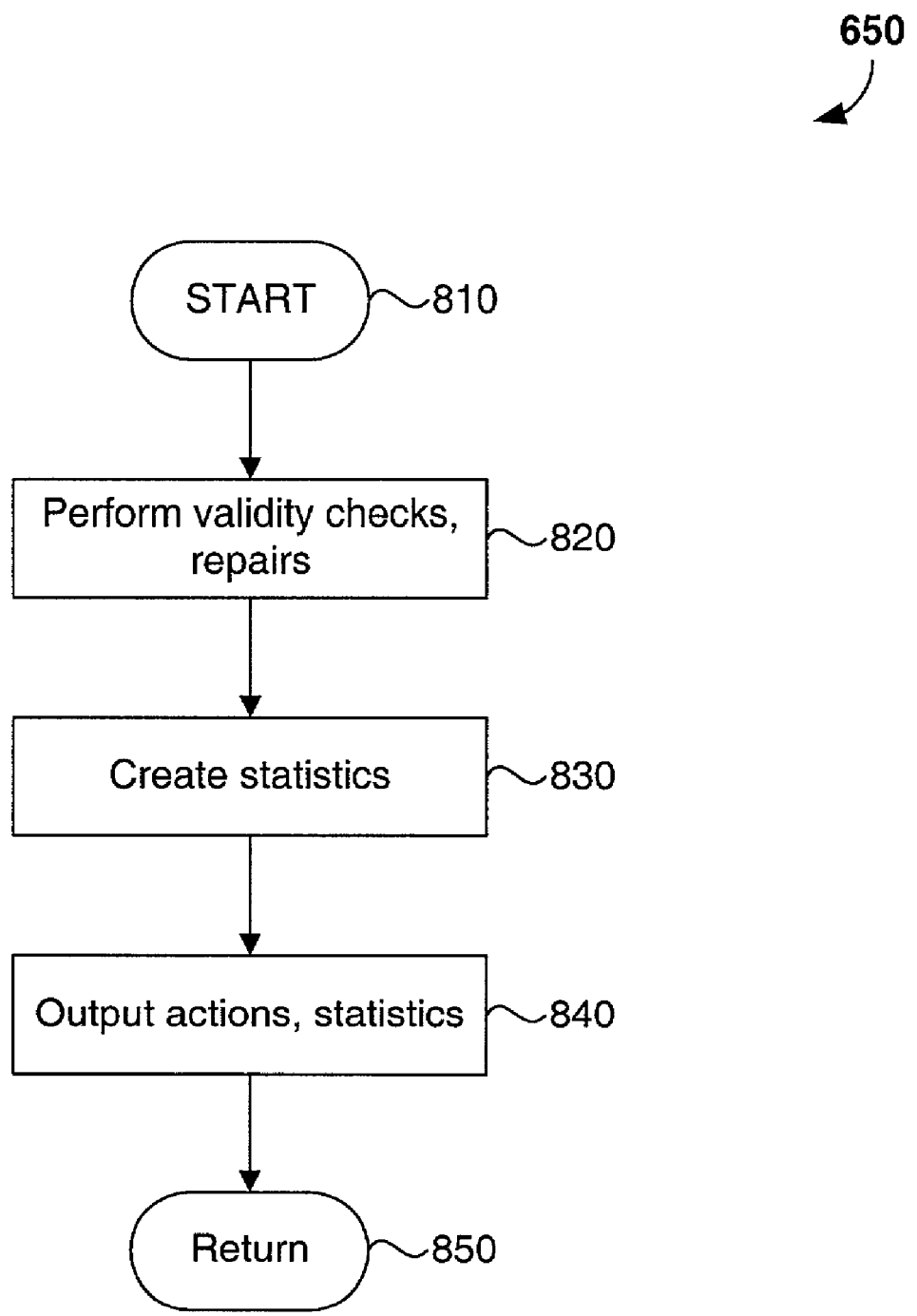
FIG. 8 illustrates post optimization processing, according to an embodiment of the invention.

Step 650 above, post-optimization processing, is illustrated in greater detail in FIG. 8. The process begins with step 810. In step 820, validity checks are performed on the optimized scene graph produced in step 640 above. Here, the optimized scene graph is analyzed for a number of possible conditions that represent errors in the graph. For example, if a group has a child node that does not reference the group as the parent, this represents an error condition. Also, if a child has a parent that does not reference the child as such, this too represents an error condition. If a child references a parent not in the graph, then this too is an error condition. If possible, these errors are also repaired in step 820.

In an embodiment of the invention, step 830 includes the creation of statistics based on the just-completed optimization process. Such statistics may include, for example, the number of nodes eliminated, the number of nodes remaining, and the depth of the resulting optimized scene graph. In step 840, the statistics and actions related to the optimization process are output. Actions may include, for example, the name of the atomic optimization that was performed, and any error conditions uncovered in step 820 above. In an embodiment of the invention, the output can be directed to memory so that a log is maintained for the optimization process. In an alternative embodiment, the information of step 840 is output to a display or other output device for the user's benefit. The process concludes at step 850.

IV. Atomic Optimizations

This section describes a set of specific atomic optimizations that can be used in the invention. This list is not intended to be comprehensive or in any way a limitation of the invention. Rather, these optimizations are presented as examples.

A. Collapse Geometry

Figure 9:
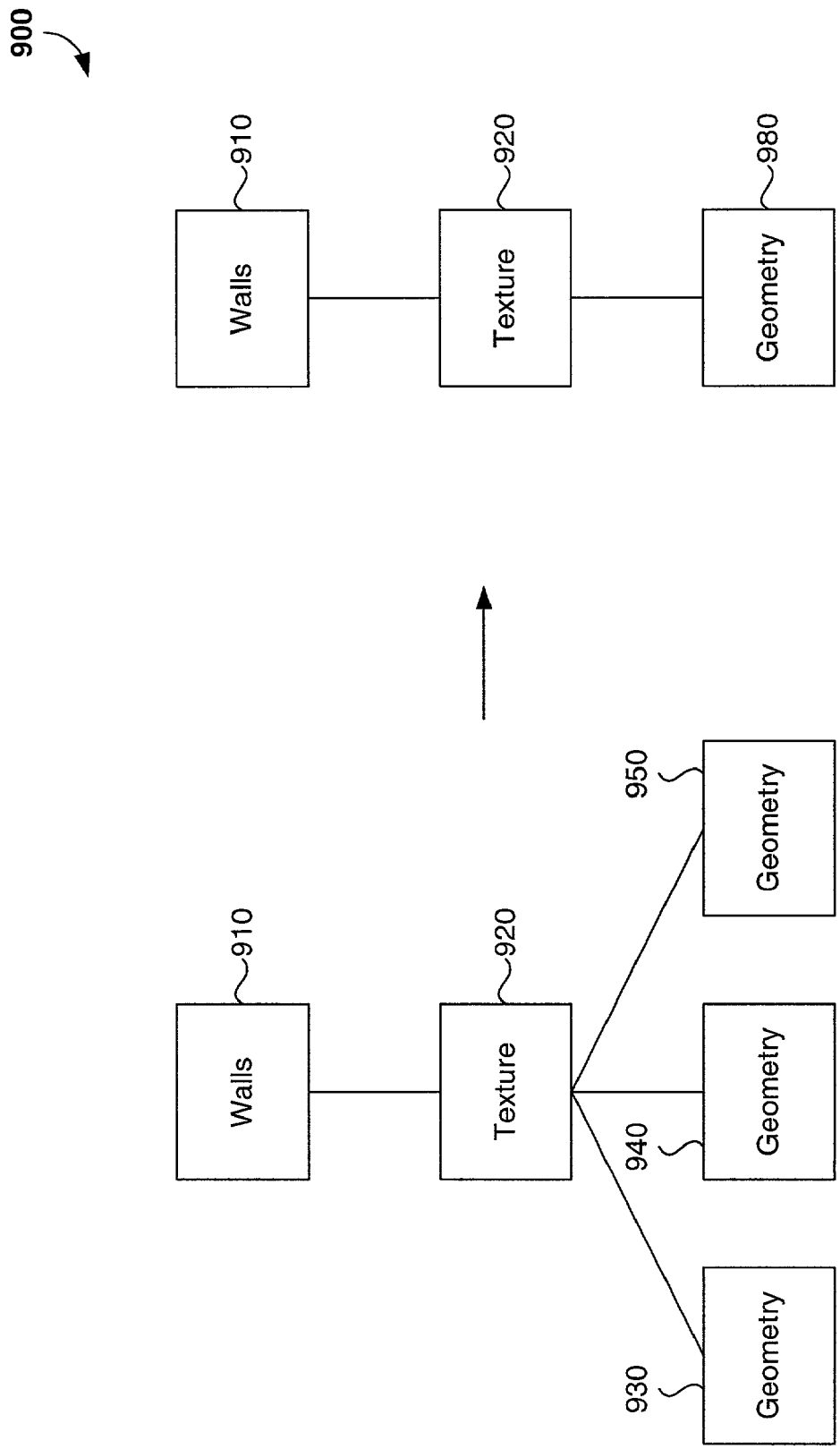
FIG. 9 illustrates an application of the collapse geometry optimization.

This optimization gathers geometries that are in the same state to create an aggregate node. In particular, the input scene graph is traversed and, for each node, a determination is made as to whether the subtree consists of geometry. If so, the geometries of the subtree are combined. This is illustrated in FIG. 9. The input scene graph includes a root node 910 that corresponds to the walls of a building. Associated with node 910 is a texture node 920. Subordinate to node 920 are three geometry nodes, 930, 940 and 950. With this optimization, the geometry nodes are gathered and collectively replaced by geometry 980 in the optimized scene graph. In the collapse geometry scene graph optimization, the user can specify a common format for the vertex array of the resulting geometry. This format specification represents a user input for the optimization.

Because the number of nodes is reduced, memory usage is reduced. Also, if all the geometries are to be drawn, drawing time will be reduced because there will be fewer function calls.

B. Collapse Hierarchy

Figure 10:
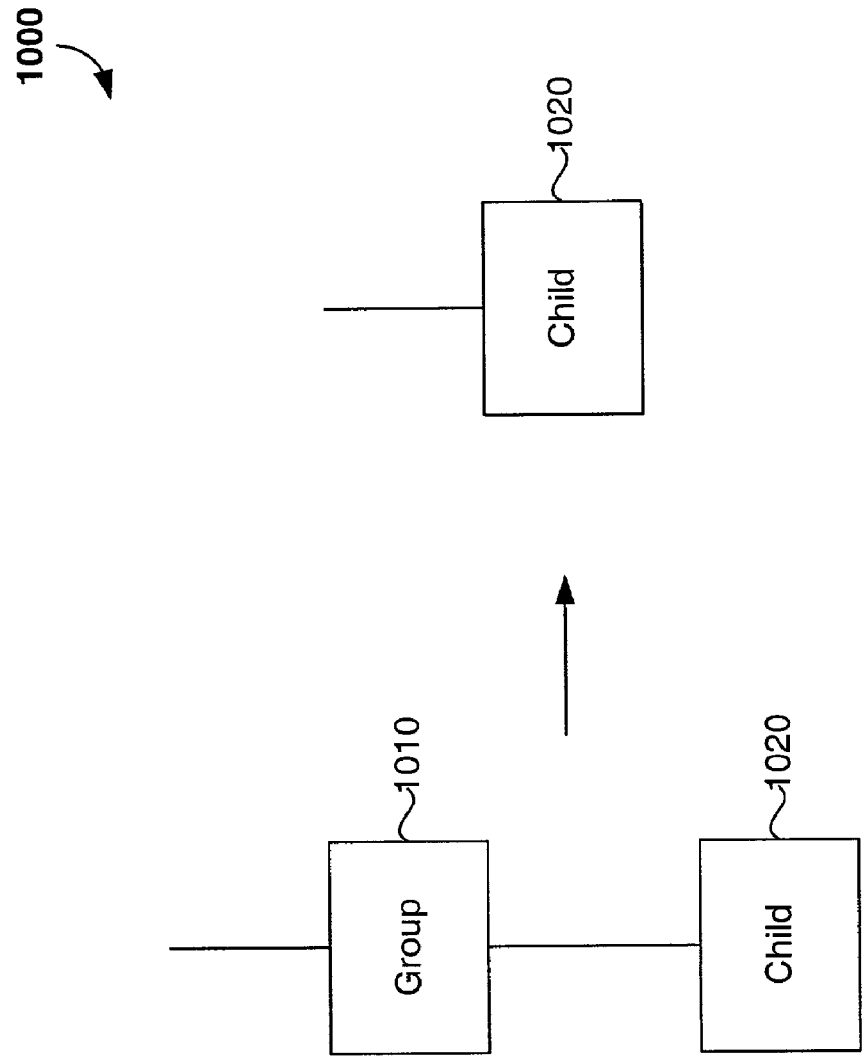
FIG. 10 illustrates an example of the collapsed hierarchy optimization.

This optimization looks for patterns in a scene graph that would allow the deletion of nodes, so as to collapse the hierarchy. For example, a group having a single child can be transformed to a subgraph containing just the child. This is illustrated in FIG. 10. A group 1010 is shown having a single child 1020. Application of this transformation leads to replacement of this subgraph with the single child node 1020.

Figure 11:
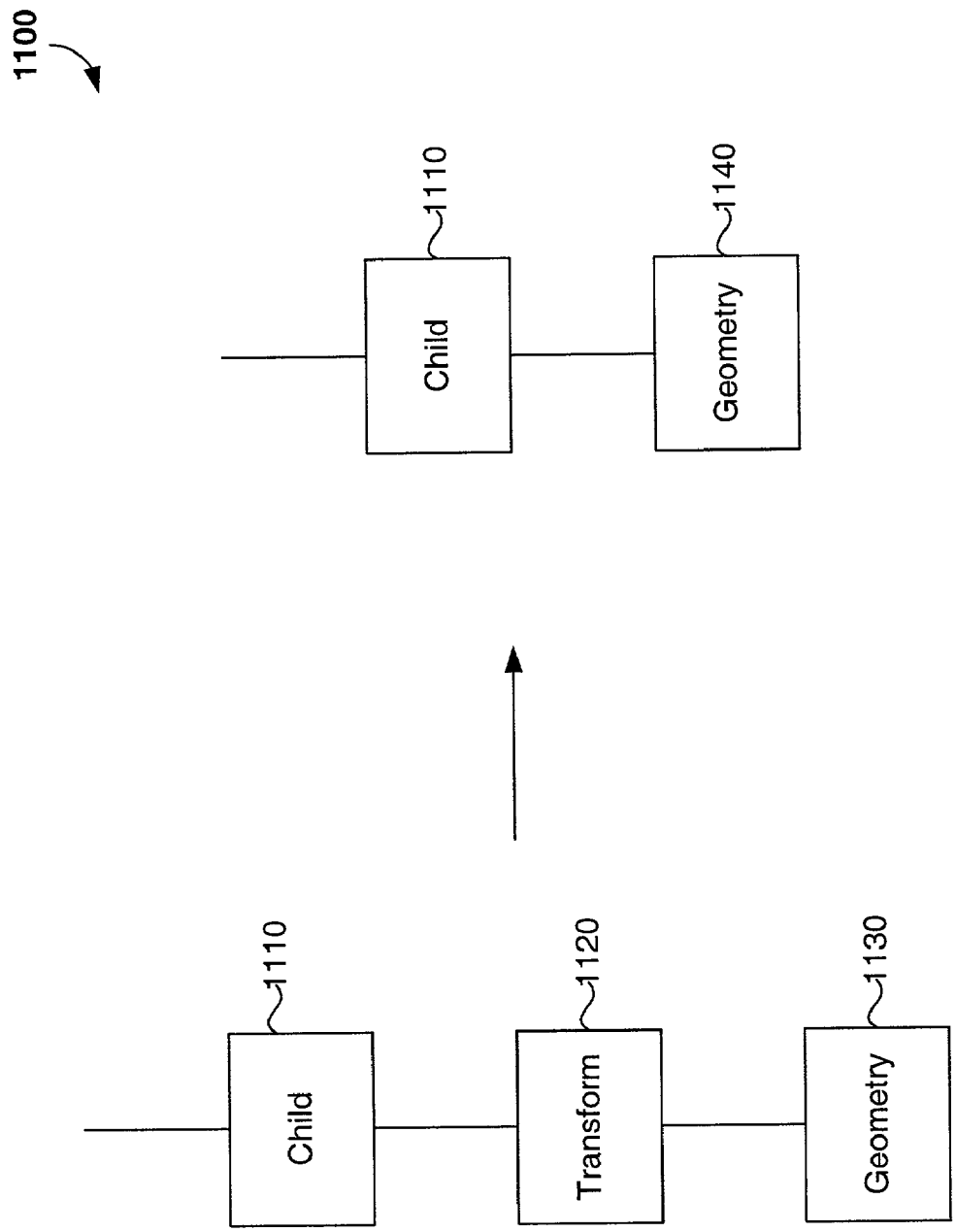
FIG. 11 illustrates a further application of the collapsed hierarchy optimization.

In another example, a geometry transform node is applied to a geometry, resulting in a transformed geometry and deletion of the transform node. This is illustrated in FIG. 11. Here a child node 1110 is followed by a transform node 1120 which, in turn, is followed by a geometry node 1130. In this optimization, the transform identified in node 1120 is applied to geometry 1130. This results in a new graph featuring child node 1110 followed by transformed geometry node 1140. This effectively pre-computes the transformation during the optimization process. In other examples of the collapsed hierarch optimization, empty attribute sets can be replaced by a single group node, and empty geometries can simply be deleted.

In general, the collapse hierarchy optimization has the benefit of enhancing the traversal time of a scene graph, and also reduces the memory usage associated with the scene graph by reducing the number of nodes.

C. Convert Image

This optimization converts an image to a pixel format specified by the user. The new format can be associated with a predetermined indexed color table, or can be a format using a different number of bits for color coordinates, e.g., 16, 24, or 32 bits. This optimization can be used to target a specific rendering platform. This has the potential to allow faster drawing and to reduce memory usage, depending on the specified format.

D. Convert Transform

This optimization pertains to animation. Animation involves a series of key frames and integration between the frames. The convert transform optimization replaces the integration (i.e., the transformation) that appears in a scene graph. The transformation is replaced by a faster transformation. In an embodiment of the invention, the faster transformation is specified by the user as an input.

For example, given a transformation node for a global-to-local mapping involving a dynamic matrix, a spline-based interpolation can be replaced by a linear interpolation. Such a convert transform optimization reduces the traversal time by reducing the matrix interpolation cost. In addition, memory usage is reduced.

Also, this optimization can include analysis of whether there is any change in the position of an element of a frame. If not, there is no need for interpolation for the element, and no need to create a full channel for it. This analysis can influence the choice of integration method.

E. Create Bounding Boxes

As the name implies, this optimization creates bounding boxes for all nodes of the input scene graph. The bounding boxes are necessary for any view frustum culling algorithm. After creation of the bounding boxes, the unnecessary bounding boxes are removed. This optimization takes the creation of bounding boxes out of run time and performs the operation during optimization instead. This optimization increases memory usage due to the creation of the bounding volumes. However, traversal time is reduced.

F. Flatten Hierarchy

Figure 12:
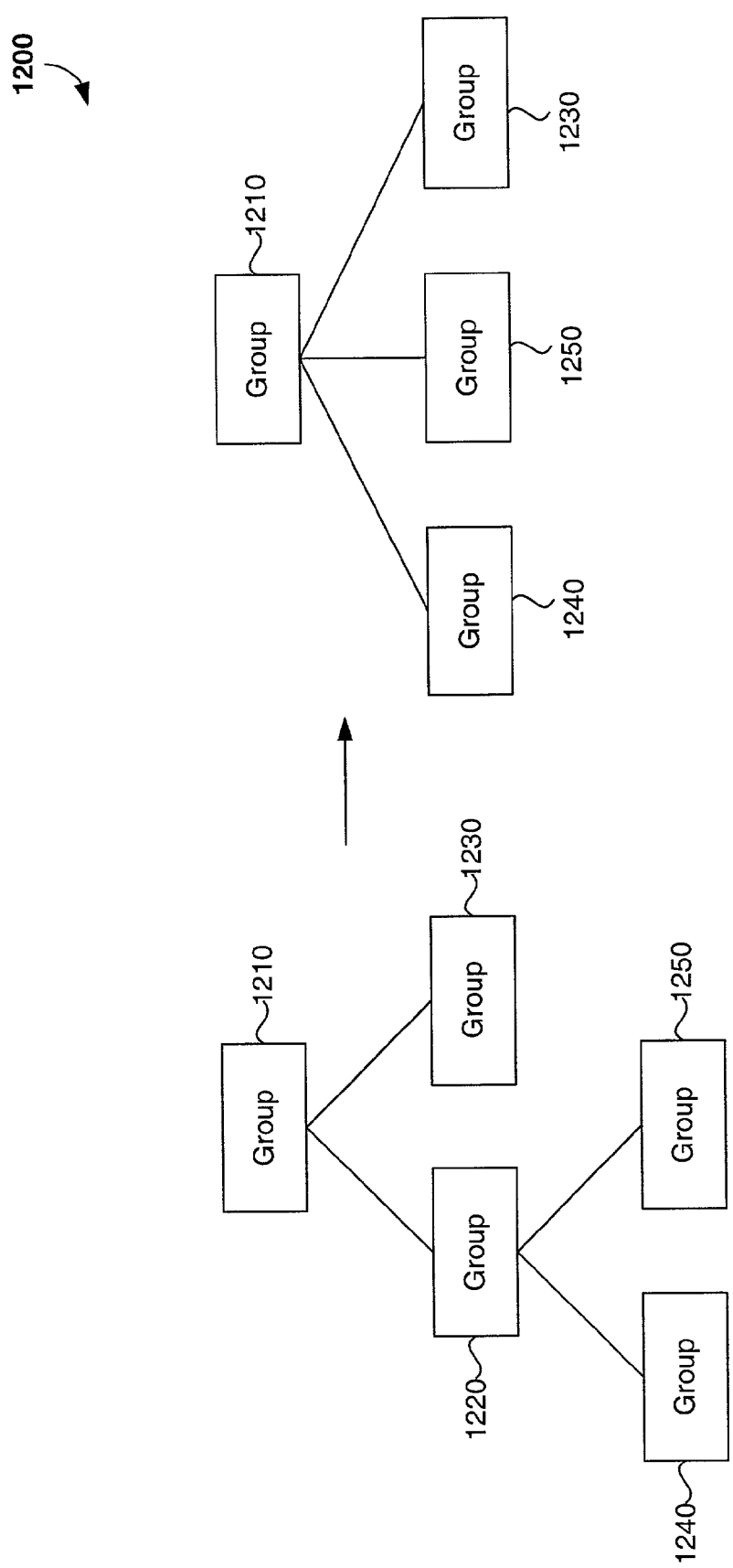
FIG. 12 illustrates an application of the flattened hierarchy optimization.

This optimization takes an input scene graph and converts it to a scene graph having a more uniform depth. In a modeler, an artist may specify a hierarchy that reflects the artist's manipulations, or the artist's steps in creation of the scene and its objects. However, there may be no need to use that specific hierarchy at run time. In light of this, it can be preferable to replace the hierarchy. The goal of this optimization is to create a hierarchy that is more amenable to other subsequent optimizations. An example of this optimization is shown in FIG. 12. In this example, a group node 1210 has a subordinate group node 1220 and a geometry 1230. Group node 1220 is in turn associated with two geometry nodes, 1240 and 1250. After applying the optimization, group node 1220 is removed so that geometry nodes 1230 through 1250 are all directly subordinate to group node 1210.

G. Generate Macro Texture

Figure 13:
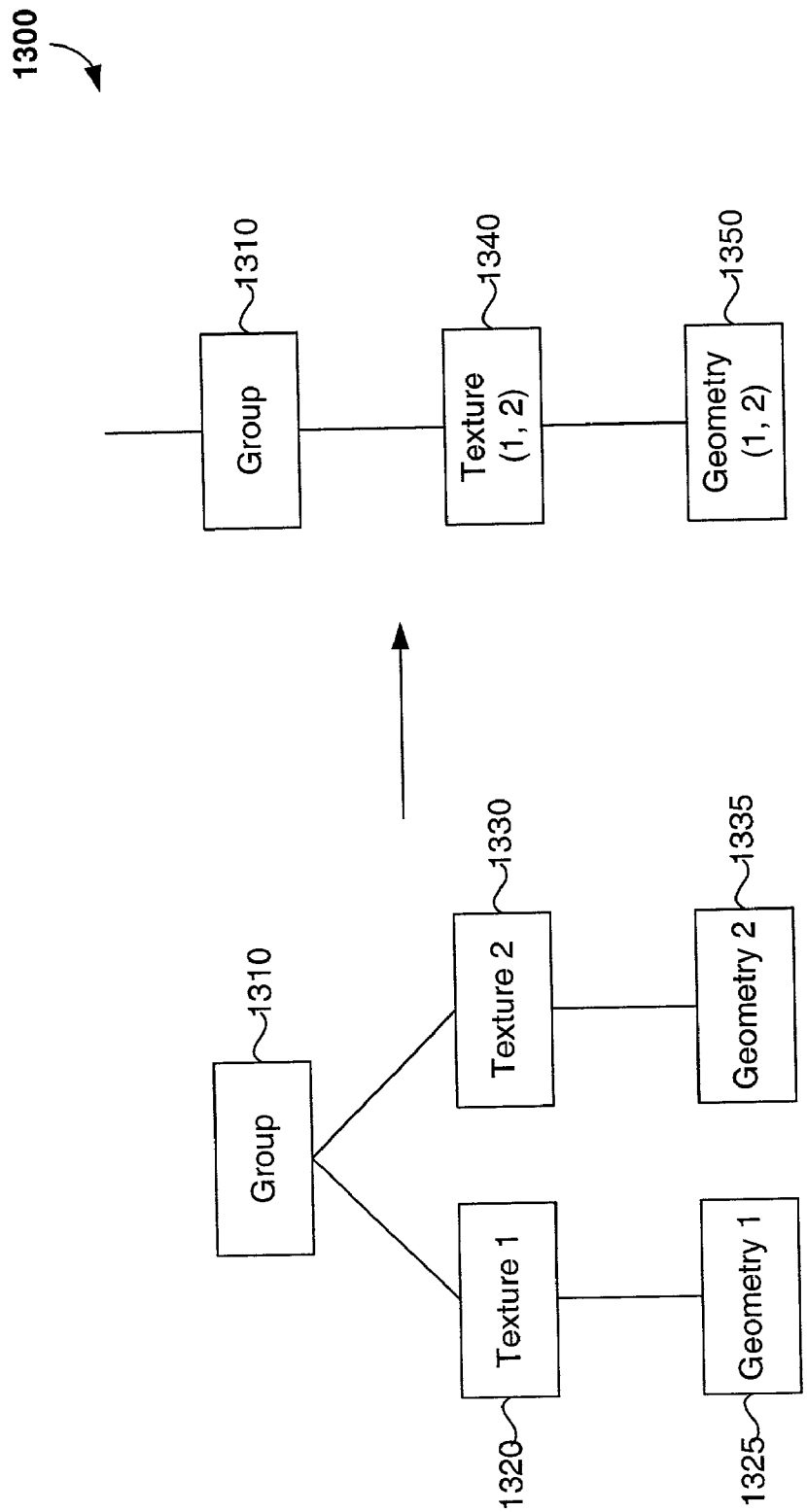
FIG. 13 illustrates an application of the generate macro texture optimization.

This optimization addresses the problem of a single object that uses more than one texture. The optimization generates a single texture composed of the individual component textures. In an embodiment of the invention, the texture coordinates are changed to use a new texture coordinate space. This is illustrated in FIG. 13. A single object, shown as group node 1310 has two associated textures, shown as texture nodes 1320 and 1330. Each of the texture nodes has an associated geometry node, geometry nodes 1325 and 1335 respectively.

This graph is transformed such that group node 1310 now has a single texture node 1340. Texture node 1340 represents a combination of the two textures 1320 and 1330. In this illustration, the two geometry nodes 1325 and 1335 are also combined to form a geometry node 1350. This avoids the alternative of having to split the original object into sub-meshes that each use different textures. In an embodiment of the invention, a bin packing algorithm is used to organize the textures in a texture page. The texture coordinates of the geometries that are using the texture are remapped to fit the generated texture page. On some platforms, a subregion texturing mode can be used to integrate textures which are repeated over triangles.

H. Normalize Texture Coordinates

This optimization reduces the absolute values of texture coordinates. Texture coordinates, used in the mapping of textures onto triangles, do not have a unique representation. Whenever a texture is repeated over a triangle, the integer part of a texture coordinate increases by the number of repeats. This leads to texture coordinates with values such as 12.3 or 14.2. It is equivalent to use values corresponding to these, such as 2.3 and 4.2. A problem arises because some rendering platforms limit the absolute value of a texture coordinate. Values that exceed this limit can create register overflows and values may be clamped, distorting the texture. In addition, if a texture is repeated too often over a triangle, then the mapping may lose precision. This optimization, therefore, reduces the absolute value of texture coordinates, and tessellates a triangle if a texture coordinate becomes too great as a result of repeating the texture over a triangle.

If triangles are created during the tessellation process, more memory will be used and the drawing time will increase. However, the drawing quality will improve.

I. Promote Attributes

Some scene graphs, such as those used by INTRINSIC GRAPHICS' ALCHEMY platform, version 1.0, available from INTRINSIC GRAPHICS of Mountain View, Calif., incorporate the concept of state inheritance. Once an attribute is declared, the attribute is used by all the subordinate attributes unless the attribute is redefined. The traversal of a scene graph is typically performed using a stack data structure. Attributes that are encountered traveling down a graph are pushed on to the stack; when returning up the graph, the encountered attributes, previously pushed, are then popped. Traversal is therefore faster if fewer attributes need to be pushed onto the stack. Moreover, drawing can take place faster.

Figure 14:
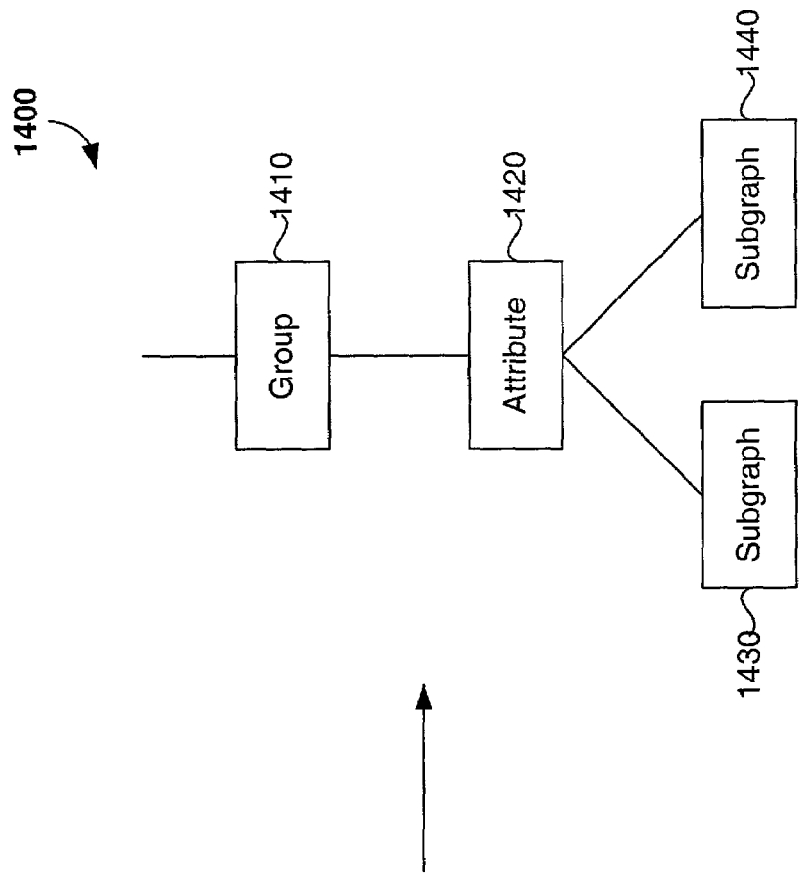
FIG. 14 illustrates an application of the promote attributes optimization.
Figure 14:
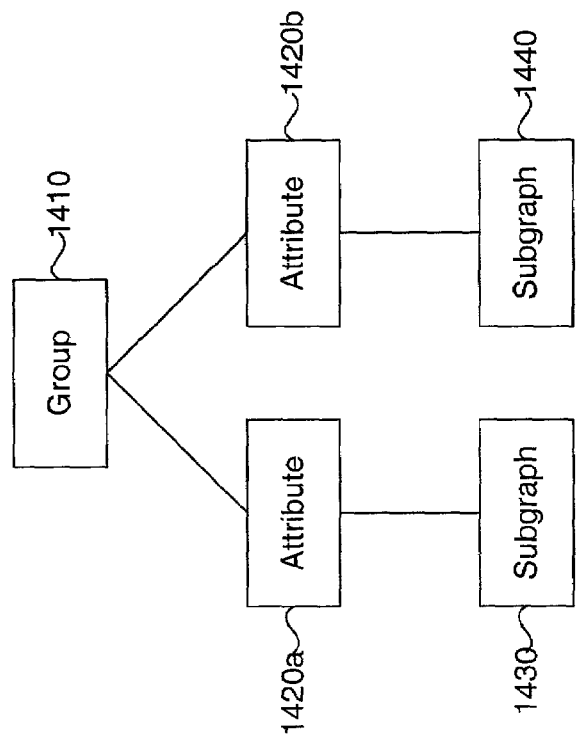

This optimization reduces the number of pushes by promoting attributes to higher tiers in the scene graph, given that such attributes are declared identically in sub-branches. An example of this optimization is illustrated in FIG. 14. A group attribute 1410 is associated with two subordinate attribute attributes, 1420a and 1420b. Subordinate to attribute 1420a is subgraph 1430; subordinate to attribute 1420b is subgraph 1440. If attribute 1420a is identical to attribute 1420b, then this optimization can be applied so that attributes 1420a and 1420b are consolidated into a single attribute 1420.

In general, this optimization examines all child attributes, and finds all the child attributes that are in the same state. These children can be considered as "found" attributes. A new attribute is then created corresponding to this state. Copies of all the found attributes are appended to this created attribute as children. Wherever the attribute is defined in a branch that is instantiated such that there is another path which leads to that branch, then a new node defining this attribute is defined for all the other paths that had used that single attribute definition. These declarations avoid the loss of the attribute when it is subsequently removed, because the attribute has been promoted in the currently analyzed branches. The declarations are subject to further optimization when the related branches are optimized for the attribute.

The attribute is then removed with respect to all the originally found attributes. Note that this optimization uses a local configuration analysis and can be applied recursively.

This optimization serves to reduce the number of pushes and pops. This improves the traversal time and the drawing time.

Promotion of attributes can be used to optimize a shader. When drawing an object, a set of states needs to be set to determine what kind of shading will be applied to the geometry. These states include, for example, the number of passes to draw and the blending functions to use. The set of states defines a shader. To accomplish shading, different lists can be used addressing the passes and other attributes. These choices depend on the capabilities of the rendering hardware.

When a list of geometries is drawn with the same shader, the cost of changing all these states is minimal. To draw several geometries with different shaders, however, all the states have to be reset for each one of shaders in the general case, because nothing is known about the context. However, in most cases not all the states need to be reset or changed. The following is an application of the promotion of attributes, to optimize a shader by reducing the cost of the shader setup:

First, replace the abstract shader by the list of passes to be drawn and the list of states (i.e. attributes) to be used for each pass. For rendering hardware that uses several texture units, a single pass can use several texture units.

Second, if calculation needs to be performed for one shader, then create an attribute to perform this operation. For example, shifting of the texture coordinates in a bump map shader can be done by the shader while traversing the graph, or in a specific attribute before drawing the geometry. Such separation has other benefits, like enabling the instantiation of the shader in the graph.

Finally, promote all the attributes used by all the shaders. The result is that if all the shaders are using the first texture unit, then there will be only one enable of this unit overall, as opposed to one per shader. This enable can be shared for different shaders, and for different passes of the same texture unit.

This operation can be done only when the capacities of the platform are known. A shader will typically be implemented in different ways, depending on the rendering hardware. This operation can be done offline (and the optimized result saved) when the hardware is know. Alternatively, this can be done after the load time if the targeted hardware cannot be predicted.

J. Remove Attributes

This optimization removes attributes that are not needed in run time. Many modelers and exporters put attributes in an exported scene graph by default, so as to reflect as closely as possible the data in the modeler. Some of this information, however, is not used in run time. This optimization deletes such attributes.

Note that the time taken by stack operations in processing a scene graph depends on the number of operations. Therefore, given 10 attributes for 1000 geometries that are defined at lowest level leaf nodes, the result is 10,000 stack operations. Hence, the elimination of attributes can save considerable time both in traversal and in drawing. Moreover, because information has been removed from the scene graph, memory usage is improved.

K. Resize Image

In this optimization, the textures used in a scene can be saved in the scene graph file itself, instead of an external image file. It may be desirable to scale down the size of all the textures of a given scene graph file, so that there is no need (or a reduced need) to page textures. The resizing of the image can be done based on the size of the texel. In the case where texture paging is still required, the image loading time is reduced. In addition, memory usage is reduced since the image is scaled down.

L. Share Attributes

When creating attributes in a scene graph, it is possible to have multiple attributes that represent the same state all sharing the same set of objects. A created texture state object, for example, can be used at multiple points in a scene graph. This optimization makes sure that any two attributes that represent the same state are sharing the same objects. This sharing of objects improves memory usage, and can also improve run time efficiency, since a cache can use a pointer to the object as an identifier.

M. Spatial Partition

This optimization improves the efficiency of the frustum culling process. It minimizes the number of tests that must be applied by improving the number of geometries culled at each test. This is done by organizing the scene spatially in bi-trees, quad-trees, and oct-trees. Such an optimization may use more memory, but enhances the frustum culling traversal process.

N. Strip Triangles

This optimization recasts a scene graph so that a mesh presented to the graphics hardware is in the form of triangle strips. A triangle strip is a series of adjacent triangles. Given a single initial triangle, a new adjacent triangle is created by defining a new point, such that the new triangle is formed by the new point and two vertices of the previous triangle. Successive triangles are then formed in this manner resulting in a triangle strip. Such a construction, in contrast to a set of independent triangles, leads to a reduction in memory usage, given that each new triangle is effectively defined by a single point.

O. Transform Alpha

This optimization rescales alpha values in accordance with a specific rendering platform. This is useful given that different rendering platforms can have different alpha ranges. In using this optimization, a user can specify an offset factor and a scale factor as parameters.

P. Vertex Blending

When using vertex blending, two parameters are relevant. First, the number of matrices for the complete mesh is relevant. Second the number of matrices per vertex must be taken into account. Depending on the rendering platform, these parameters may have upper bounds. To use a hardware accelerated vertex blending feature, therefore, the mesh may have to be split, regrouped, reindexed or some weight might be discarded.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments, but should be defined only in accordance with the following claims and their equivalents.

What is claimed is:

1. A system for optimization of a scene graph, comprising:
an optimization base comprising logic for at least one atomic optimization;
an optimization registry listing said at least one atomic optimization, and further listing parameter and priority information associated with said at least one atomic optimization;
an optimization manager for creating, configuring, and applying an optimization process to an input scene graph, wherein said optimization process comprises logic for an atomic optimization; and
an optimization configuration manager for accepting user configuration information to said optimization process, said user configuration information comprising selection of one or more of said at least one atomic optimization.

2. The system of claim 1, further comprising a user interface through which a user can provide said user configuration information to said optimization configuration manager.

3. The system of claim 2, wherein said user interface is provided to a user by a modeler that produces the scene graph to be optimized.

4. The system of claim 1, wherein said user configuration information comprises a specification of parameter values associated with said selected atomic optimization.

5. The system of claim 1, wherein said at least one atomic optimization comprises a collapse geometry optimization.

6. The system of claim 1, wherein said at least one atomic optimization comprises a collapse hierarchy optimization.

7. The system of claim 1, wherein said at least one atomic optimization comprises a convert image optimization.

8. The system of claim 1, wherein said at least one atomic optimization comprises a convert transform optimization.

9. The system of claim 1, wherein said at least one atomic optimization comprises a create bounding boxes optimization.

10. The system of claim 1, wherein said at least one atomic optimization comprises a flatten hierarchy optimization.

11. The system of claim 1, wherein said at least one atomic optimization comprises a generate macro texture optimization.

12. The system of claim 1, wherein said at least one atomic optimization comprises a normalize texture coordinates optimization.

13. The system of claim 1, wherein said at least one atomic optimization comprises a promote attributes optimization.

14. The system of claim 1, wherein said at least one atomic optimization comprises a remove attributes optimization.

15. The system of claim 1, wherein said at least one atomic optimization comprises a resize image optimization.

16. The system of claim 1, wherein said at least one atomic optimization comprises a share attributes optimization.

17. The system of claim 1, wherein said at least one atomic optimization comprises a spatial partition optimization.

18. The system of claim 1, wherein said at least one atomic optimization comprises a strip triangles optimization.

19. The system of claim 1, wherein said at least one atomic optimization comprises a transform alpha optimization.

20. The system of claim 1, wherein said at least one atomic optimization comprises a vertex blending optimization.

21. A method of optimization of a scene graph, comprising the steps of:
a. receiving an input scene graph;
b. creating an optimization process; and
c. applying the optimization process to the input scene graph to create a scene graph optimized for at least one of
    enhancement of traversal time,
    enhancement of drawing time,
    reduction of memory usage,
    efficiency of data manipulation, and
    targeting a specific rendering platform,
wherein said step b comprises the steps of:
    i. receiving user input identifying an atomic optimization and any associated parameters;
    ii. accessing the atomic optimization via an optimization registry;
    iii. incorporating the atomic optimization into the optimization process;
    iv. if the user input comprises parameters associated with the optimization, configuring the optimization process according to the parameters; and
    v. if the user input does not comprise parameters, configuring the optimization process according to default parameters.

22. The method of claim 21, wherein the atomic optimization comprises a collapse geometry optimization.

23. The method of claim 21, wherein the atomic optimization comprises a collapse hierarchy optimization.

24. The method of claim 21, wherein the atomic optimization comprises a convert image optimization.

25. The method of claim 21, wherein the atomic optimization comprises a convert transform optimization.

26. The method of claim 21, wherein the atomic optimization comprises a create bounding boxes optimization.

27. The method of claim 21, wherein the atomic optimization comprises a flatten hierarchy optimization.

28. The method of claim 21, wherein the atomic optimization comprises a generate macro texture optimization.

29. The method of claim 21, wherein the atomic optimization comprises a normalize texture coordinates optimization.

30. The method of claim 21, wherein the atomic optimization comprises a promote attributes optimization.

31. The method of claim 21, wherein the atomic optimization comprises a remove attributes optimization.

32. The method of claim 21, wherein the atomic optimization comprises a resize image optimization.

33. The method of claim 21, wherein the atomic optimization comprises a share attributes optimization.

34. The method of claim 21, wherein the atomic optimization comprises a spatial partition optimization.

35. The method of claim 21, wherein the atomic optimization comprises a strip triangles optimization.

36. The method of claim 21, wherein the atomic optimization comprises a transform alpha optimization.

37. The method of claim 21, wherein the atomic optimization comprises a vertex blending optimization.

38. The method of claim 21, further comprising the step of:
d. performing post optimization processing.

39. The method of claim 21, further comprising the step of:
d. outputting an optimized scene graph.

40. A computer program product comprising a computer usable medium having computer readable program code means embodied in said medium for causing an application program to execute on a computer that optimizes a scene graph, said computer readable program code means comprising:
a. computer readable program code means for causing the computer to receive an input scene graph;
b. computer readable program code means for causing the computer to create an optimization process; and
c. computer readable program code means for causing the computer to apply the optimization process to the input scene graph to create a scene graph optimized for at least one of enhancement of traversal time,
enhancement of drawing time,
reduction of memory usage,
efficiency of data manipulation, and
targeting a specific rendering platform,
wherein said computer readable program code means b comprises:
   i. computer readable program code means for causing the computer to receive user input identifying an atomic optimization and any associated parameters;
   ii. computer readable program code means for causing the computer to access the atomic optimization via an optimization registry;
   iii. computer readable program code means for causing the computer to incorporate the atomic optimization into the optimization process;
   iv. computer readable program code means for causing the computer to configure the optimization process according to the parameters, if the user input comprises parameters associated with the optimization; and
   v. computer readable program code means for causing the computer to configure the optimization process according to default parameters, if the user input does not comprise parameters.

41. The computer program product of claim 40, wherein the atomic optimization comprises a collapse geometry optimization.

42. The computer program product of claim 40, wherein the atomic optimization comprises a collapse hierarchy optimization.

43. The computer program product of claim 40, wherein the atomic optimization comprises a convert image optimization.

44. The computer program product of claim 40, wherein the atomic optimization comprises a convert transform optimization.

45. The computer program product of claim 40, wherein the atomic optimization comprises a create bounding boxes optimization.

46. The computer program product of claim 40, wherein the atomic optimization comprises a flatten hierarchy optimization.

47. The computer program product of claim 40, wherein the atomic optimization comprises a generate macro texture optimization.

48. The computer program product of claim 40, wherein the atomic optimization comprises a normalize texture coordinates optimization.

49. The computer program product of claim 40, wherein the atomic optimization comprises a promote attributes optimization.

50. The computer program product of claim 40, wherein the atomic optimization comprises a remove attributes optimization.

51. The computer program product of claim 40, wherein the atomic optimization comprises a resize image optimization.

52. The computer program product of claim 40, wherein the atomic optimization comprises a share attributes optimization.

53. The computer program product of claim 40, wherein the atomic optimization comprises a spatial partition optimization.

54. The computer program product of claim 40, wherein the atomic optimization comprises a strip triangles optimization.

55. The computer program product of claim 40, wherein the atomic optimization comprises a transform alpha optimization.

56. The computer program product of claim 40, wherein the atomic optimization comprises a vertex blending optimization.

57. The computer program product of claim 40, further comprising:
   d. computer readable program code means for causing the computer to perform post optimization processing.

58. The computer program product of claim 40, further comprising:
   d. computer readable program code means for causing the computer to output an optimized scene graph.

59. A method of optimization of a scene graph, comprising the steps of:
   a. receiving an input scene graph;
   b. creating an optimization process;
   c. applying the optimization process to the input scene graph to create a scene graph optimized for at least one of
      enhancement of traversal time,
      enhancement of drawing time,
      reduction of memory usage,
      efficiency of data manipulation, and
      targeting a specific rendering platform; and
   d. performing post optimization processing, wherein said step d comprises the steps of:
      i. performing validity checks on the optimized scene graph;
      ii. creating statistics based on the optimization process; and
      iii. outputting the statistics.

60. A computer program product comprising a computer usable medium having computer readable program code means embodied in said medium for causing an application program to execute on a computer that optimizes a scene graph, said computer readable program code means comprising:
   first computer readable program code means for causing the computer to receive an input scene graph;
   second computer readable program code means for causing the computer to create an optimization process; and
   third computer readable program code means for causing the computer to apply the optimization process to the input scene graph to create a scene graph optimized for at least one of
      enhancement of traversal time,
      enhancement of drawing time,
      reduction of memory usage,
      efficiency of data manipulation, and
      targeting a specific rendering platform; and
   fourth computer readable program code means for causing the computer to perform post optimization processing
wherein said fourth computer readable program code means comprises:
   i. computer readable program code means for causing the computer to perform validity checks on the optimized scene graph;
   ii. computer readable program code means for causing the computer to create statistics based on the optimization process; and
   iii. computer readable program code means for causing the computer to output the statistics.

* * * * *

UNITED STATES PATENT AND TRADEMARK OFFICE
CERTIFICATE OF CORRECTION

PATENT NO. : 6,995,765 B2 Page 1 of 1
DATED : February 7, 2006
INVENTOR(S) : Pierre S. Boudier It is certified that error appears in the above-identified patent and that said Letters Patent is hereby corrected as shown below:

<u>Column 5,</u>
Line 7, insert the following paragraph:
-- Optimizer 330 is shown in greater detail in FIG. 4, according to an embodiment of the invention. An input scene graph 325 is received by an optimization manager 410. Optimization manager 410 creates an optimization process based on a specific atomic optimization. The atomic optimization can be identified by a user, or a default optimization can be used. Optimization manager 410 also configures the atomic optimization. The configuration can be based on user input, or can be based on default configuration values. Optimization manager 410 then applies the optimization process to input scene graph 405, to produce an optimized graph 435. --.

Signed and Sealed this

Twenty-fifth Day of April, 2006

JON W. DUDAS
*Director of the United States Patent and Trademark Office*